United States Patent [19]

Greb et al.

[11] Patent Number: 5,111,117
[45] Date of Patent: May 5, 1992

[54] DISCHARGE TUBE ARRANGEMENT

[75] Inventors: Ulrich Greb; Andrew T. Rowley, both of Leicester, England

[73] Assignee: Thorn Emi plc, London, England

[21] Appl. No.: 577,161

[22] Filed: Sep. 4, 1990

[30] Foreign Application Priority Data

Sep. 5, 1989 [GB] United Kingdom ............... 8920051

[51] Int. Cl.⁵ ............................................ H05B 41/16
[52] U.S. Cl. ...................................... 315/248; 315/39; 315/344; 313/234
[58] Field of Search ............... 315/248, 39, 111.21, 315/111.51; 313/607, 234

[56] References Cited

U.S. PATENT DOCUMENTS

| 4,792,725 | 10/1988 | Levy | 315/248 |
| 4,810,933 | 3/1989 | Moisan | 315/248 |
| 4,906,898 | 3/1990 | Moisan | 315/248 |

Primary Examiner—Eugene R. LaRoche
Assistant Examiner—Amir Zarabian
Attorney, Agent, or Firm—Fleit, Jacobson, Cohn, Price, Holman & Stern

[57] ABSTRACT

An electrodeless discharge tube containing an ionizable fill, the tube having a first portion for insertion in a launcher and a further portion separated from the first portion by a partition wall. Hence a discharge can be excited in the further portion because a surface wave can propagate through the wall separating the first and further portions.

8 Claims, 3 Drawing Sheets

DISCHARGE TUBE ARRANGEMENT

FIELD OF THE INVENTION

This invention relates to a discharge tube arrangement and in particular, though not exclusively, to such an arrangement for use as a light source. In particular, this invention relates to a discharge tube for such a discharge tube arrangement.

BACKGROUND OF THE INVENTION

It is known, e.g. as disclosed in EP 0225753A (University of California), to generate and sustain a discharge in a gas using electromagnetic surface waves. Surface waves are created by a launcher which is positioned around and external of, but not extending the whole length of, the discharge tube containing the gas. In such an arrangement, it is not necessary to provide electrodes inside the discharge tube. The power to generate the electromagnetic wave is provided by a radio frequency (r.f.) power generator.

EP 0225753A discloses that if enough power is supplied, the surface wave can extend to the far end of the tube and be reflected. Accordingly, uniformity of radiation output from the tube can be enhanced by arranging the length and impedance of the tube to sustain a reflected surface wave from the end furthest from the launcher to nearly the front wall of the launcher. The reflected wave will excite and ionize the gas in the tube in addition to the excitation due to the original wave.

OBJECT OF THE INVENTION

It is the object of the present invention to provide a discharge tube arrangement in which power can be carried away from the launcher area.

SUMMARY OF THE INVENTION

According to the present invention there is provided an electrodeless discharge tube comprising a first portion for insertion in a launcher, said first portion containing a fill for propagating a surface wave, a further portion containing an ionizable fill, and a partition wall effecting separation of said first portion from said further portion, wherein said surface wave set up within the first portion propagates through the partition wall to set up a discharge in the fill in said further portion.

The inventors have found that a discharge can be excited in the further portion because the surface wave can propagate through the wall separating the first and further portions. This is in contradistinction to the prior art which has emphasized that the surface wave will be reflected from the end of the tube. A discharge tube provided in accordance with the present invention enables power to be carried away from the launcher area.

The provision of a partition wall between the first and further portions enables the further portion to contain a different fill from the first portion. This allows the first portion which would be inserted in the launcher to contain a fill, such as a noble gas, which may not emit the required radiation but which allows the surface wave to be propagated away from the launcher while the further portion contains an ionizable fill which can be excited to emit radiation of the required spectrum.

The further portion may contain a metal halide fill such as disclosed in our copending British patent application No. 8915611.1.

For particular applications, the further portion may have a maximum transverse dimension greater than the maximum transverse dimension of the first portion. Alternatively, or in addition, the further portion may have a dissimilar cross-section from said first portion.

A variety of configurations are possible. The partition wall may consist of an end of the first portion. Alternatively the further portion may encompass, at least in part, the first portion. The further portion may comprise more than one portion, adjacent portions being separated by a respective partition wall.

Embodiments of the present invention will now be described, by way of example only, and with reference to the accompanying drawings in which:

DESCRIPTION OF PREFERRED EMBODIMENTS

Figure 1:
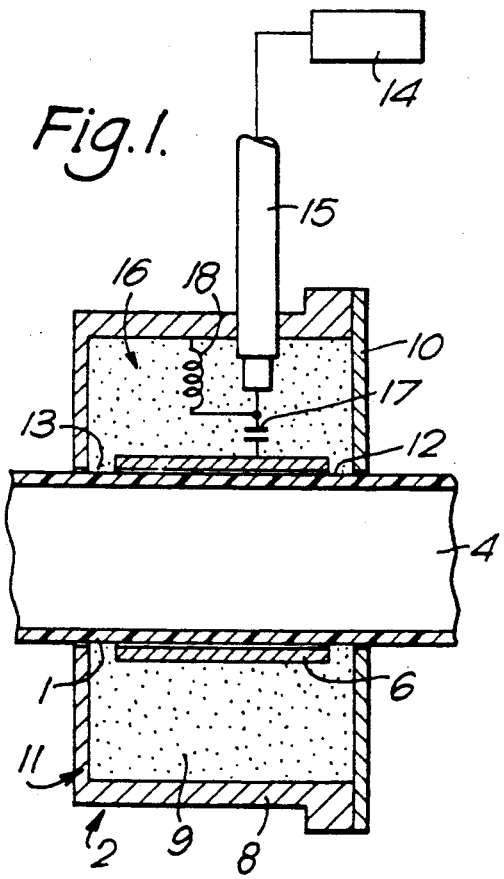
FIGS. 1 and 2 show sectional views of discharge tube arrangements, incorporating electrodeless discharge tubes.

As shown in FIG. 1, a discharge tube arrangement comprises a discharge tube 1 (shown in part) mounted in a launcher 2. The discharge tube 1 is formed of a light transmissive, dielectric material, such as glass, and contains a fill 4.

The launcher 2 is made of an electrically conductive material, such as brass, and formed as a coaxial structure comprising an inner cylinder 6 and an outer cylinder 8. Dielectric material 9 is provided inside the launcher 2, inter alia to hold the inner cylinder 6 in position within the outer cylinder 8. A first plate 10, at one end of the outer cylinder, provides a first end wall for the launcher structure. At the other end of the outer cylinder 8, a second plate 11, integral with the outer cylinder 8, provides a second end wall. The inner cylinder 6 is shorter than the outer cylinder 8 and so positioned within the outer cylinder 8 as to define a first annular gap 12 and a second annular gap 13. Each of the first plate 10 and second plate 11 has an aperture for passage of the discharge tube 1. The outer cylinder 8, the first plate 10 and the second plate 11 form an unbroken electrically conductive path around, but not in electrical contact with, the inner cylinder 6 to provide an r.f. screening structure therearound.

Suitable dimensions for the launcher of FIG. 1 are as follows:

| | |
|---|---|
| Launcher length | 7-20 mm |
| Launcher diameter (outer cylinder 8 diameter) | 25-35 mm but depends on size of discharge tube 1. |
| Inner cylinder 6 length | 3-18 mm |
| Inner cylinder 6 diameter | 13 mm but depends on size of discharge tube 1. |
| Length of launching gap (first gap 12) | 0.5-3 mm |
| Length of second gap 13. | 1-10 mm. |

The thickness of the electrically conductive material is of the order of millimetres, or less, depending on the method of construction used.

An r.f. power generator 14 (shown schematically) is electrically connected to the launcher 2 via a coaxial cable 15 and an impedance matching network 16 (shown schematically) consisting of capacitors 17 and inductors 18. The r.f. power generator 14, the impedance matching network 15, the coaxial cable 18 and the launcher 2 constitute an r.f. powered excitation device to energise the gas fill to produce a discharge.

When the r.f. power generator 14 is switched on, an oscillating electric field, having a frequency typically in the range of from 1MHz to 1GHz, is set up inside the launcher 2. At the first and second gaps 12, 13, this electric field is parallel to the longitudinal axis of the tubular portion of the discharge tube 1. If sufficient power is applied, the consequent electric field produced in the gas fill 4 is sufficient to ionise the mercury to create a discharge through which an electromagnetic surface wave may be propagated in a similar manner to the arrangement of EP 0225753A. Accordingly, the launcher 2 powered by the r.f. power generator 14 creates and sustains a discharge in the gas fill—the length and brightness of the discharge depending, inter alia, on the size of the discharge tube 1 and the power applied by the r.f. power generator 14. Such a discharge tube arrangement may therefore be used as a light source.

In the embodiment of FIG. 1, the first gap 12 and the second gap 13 each extend axially from respective ends of the inner cylinder 6, respectively to the first plate 10 and second plate 11. As the discharge tube 1 extends from both ends of the launcher 2, both the first and the second gaps 12, 13 are effective as launching gaps to create a discharge. If the first and second gaps 12, 13 are the same size, this results in a relatively symmetric discharge.

Figure 2:
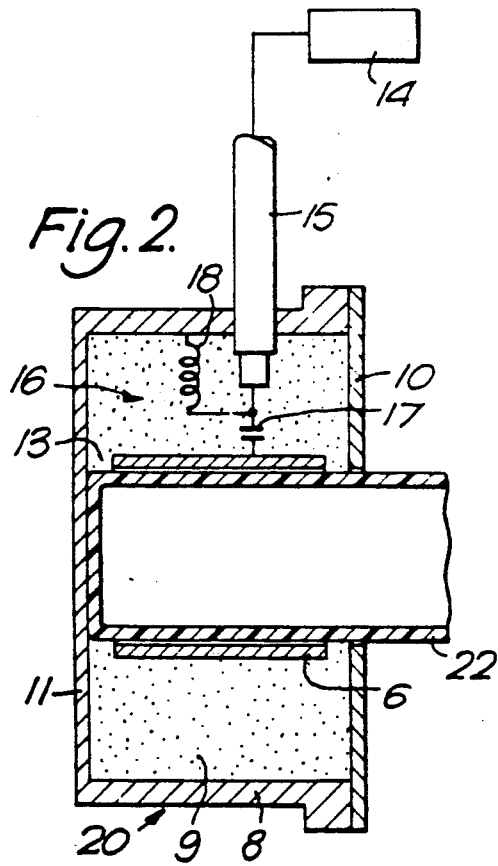

FIG. 2 shows a second embodiment of a discharge tube arrangement. The launcher 20 is formed as a coaxial structure in a similar manner to the launcher 2 of FIG. 1 and accordingly like parts are designated by like reference numerals. No aperture is provided in the second plate 11 and accordingly a discharge tube 22 (shown in part) extends from one side of the launcher 20 only. When power is supplied, the second gap 13 complements the effect of the first gap 12, which, as the launching gap, creates the discharge. The second gap 13 is, in this embodiment, advantageously larger than the launching gap 12 As with the embodiment of FIG. 1, the r.f. power at the second gap 13 is dissipated in the discharge and not lost from the system as in prior art launchers.

Examples of electrodeless discharge tubes provided in accordance with the present invention and which can be used with the discharge tube arrangements of FIGS. 1 and 2 are shown in FIGS. 3 to 7.

Figure 3:
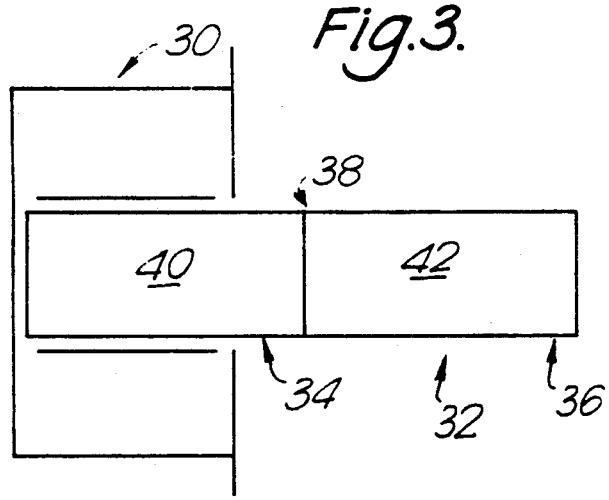
FIGS. 3 to 7 are schematic representations in cross-section of embodiments of discharge tube arrangements incorporating electrodeless discharge tubes provided in accordance with the present invention.

In FIG. 3, a launcher 20 is shown schematically in cross-section and referenced generally by the numeral 30. An electrodeless discharge tube 32 comprises a first portion 34 separated from a further portion 36 by a partition wall 38 which is an end of the first portion 34. The first portion 34 is inserted in the launcher 30 and contains a fill 40 of noble gas, such as argon, in which a surface wave discharge can be propagated. The second portion 36 contains a fill 42 of argon and sufficient mercury to form a low pressure mercury vapour discharge. It has been found that on energisation of the launcher 30, a surface wave is set up in the first portion 34 to carry power away from the launcher 30, the surface wave propagating through the partition wall 38 and into the further portion to set up a discharge in the fill 42.

Figure 4:
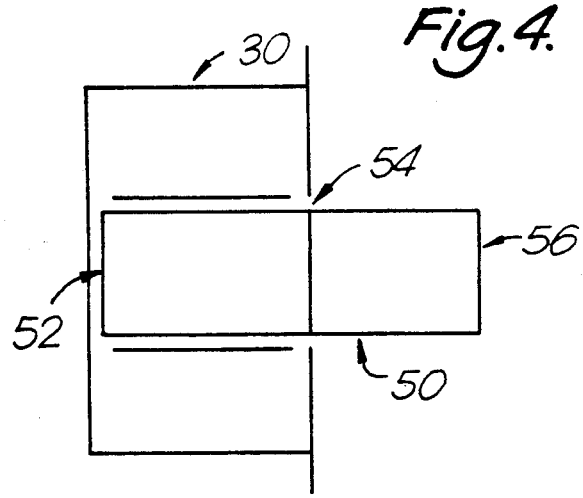

The provision of a Partition wall enables different parts of the discharge tube to contain different fills. This could be particularly useful when the radiation emitting fill is one in which a surface wave cannot be sustained for a long distance. FIG. 4 shows an electrodeless discharge tube 50 in which the first portion 52 is of substantially the same length as the launcher 30 and enables power to be carried away from the launcher. The surface wave so set up propagates through a partition wall 54 into the further portion 56 which contains a fill for producing the required radiation emitting discharge.

Figure 5:
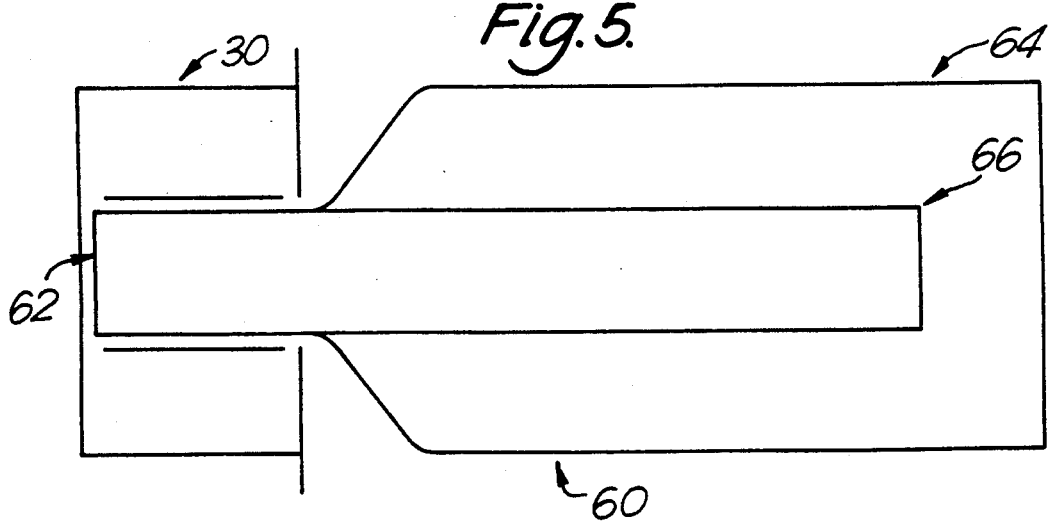

In FIG. 5, the electrodeless discharge tube 60 comprises a first portion 62 for insertion in the launcher 30 and a further portion 64 encompassing part of the first portion 62. The partition wall 66 separating the first and further portions 62, 64 is the tube wall of the first portion 62. As with the embodiments of FIGS. 3 and 4, the first portion 62 contains a noble gas at low pressure and is used to carry power away from the launcher 30 into the further portion 64 which contains a fill for producing the required discharge.

Figure 6:
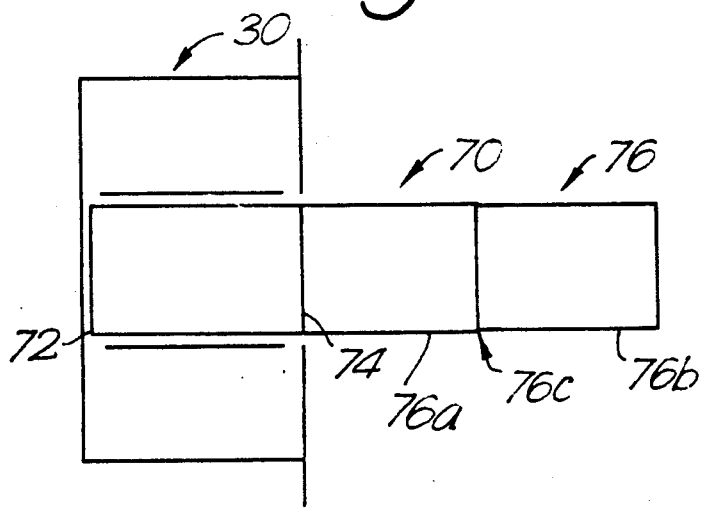

Further modifications are shown in FIGS. 6 and 7. In FIG. 6, an electrodeless discharge tube 70 comprises a first portion 72 separated by a partition wall 74 from a further portion 76, the further portion 76 itself comprising two portions 76a, 76b separated by a partition wall 76c. The first portion 72 contains a fill which enables power to be carried away from the launcher 30 by a surface wave. The surface wave is able to propagate through the partition walls 74, 76c to excite the fill in the portions 76a, 76b and so generate the required radiation. The number of portions and so the number of different fills which can be used may be varied for aesthetic effect.

Figure 7A:
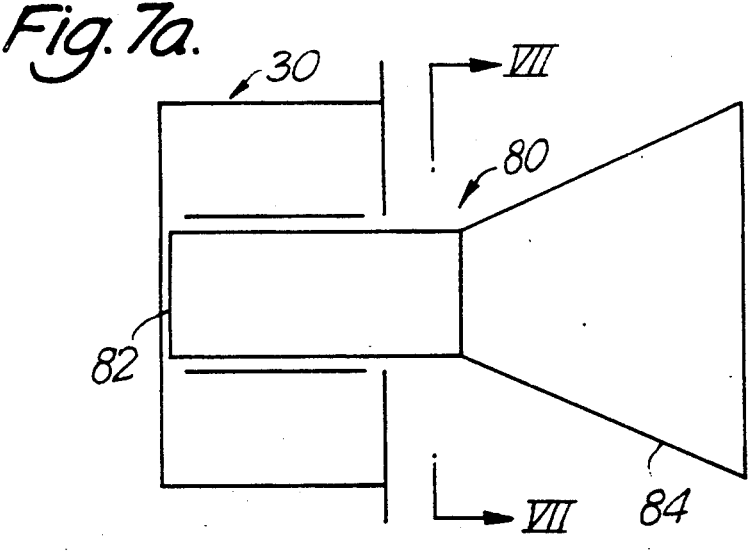
Figure 7B:
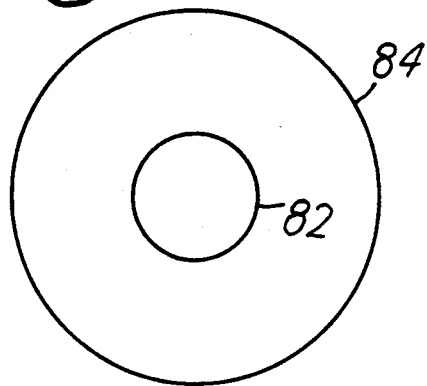
Figure 7C:
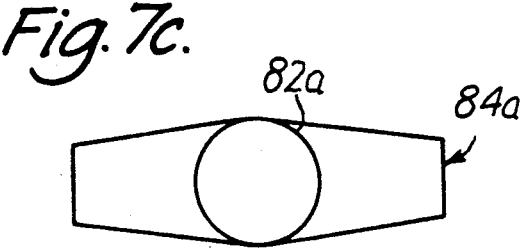

FIG. 7a shows an electrodeless discharge tube 80 in which the first portion 82 and a further portion 84 have different cross-sections. In the cross-sectional view along VII-VII shown in FIG. 7B, the first and further portions 80, 82 are of the same shape but different size. In the cross sectional view shown in FIG. 7c, the first and further portions 82a, 84a are of dissimilar cross-sections. In each case, the further portion has a minimum transverse dimension greater than the maximum transverse dimension of the first portion, the first portion being used to enable power to be carried away from the launcher. The separation of the first and further portions allows different fills to be used in the two portions.

Other modification to the embodiments described and within the scope of the present invention will be apparent to those skilled in the art. While the provision of a partition wall particularly allows different fills to be used in the separate portions, it is evident that the same fill may be used in the separate portions if required.

We claim:

1. An electrodeless discharge tube comprising a first portion for insertion in a launcher, said first portion containing a fill for propagating a surface wave, a further portion containing an ionizable fill, and a partition wall affecting separation of said first portion from said further portion, wherein said surface wave set up within the first portion propagates through the partition wall to set up a discharge in the fill in said further portion.

2. A discharge tube according to claim 1, wherein the fill in said first portion consists of a noble gas.

3. A discharge tube according to claim 1 wherein the fill in said further portion comprises a metal halide.

4. A discharge tube according to claim 1, wherein said further portion has a maximum transverse dimension greater than the maximum transverse dimension of said first portion.

5. A discharge tube according to claim 1, wherein said further portion has a dissimilar cross-section from said first portion.

6. A discharge tube according to claim 1, wherein said partition wall consists of an end of said first portion.

7. A discharge tube according to claim 1, wherein said further portion encompasses, at least in part, said first portion.

8. A discharge tube according to claim 1, wherein said a plurality of portions are provided, adjacent portions being separated by further respective partition walls.

* * * * *